(12) United States Patent
Francini et al.

(10) Patent No.: US 8,136,547 B2
(45) Date of Patent: Mar. 20, 2012

(54) POPPET VALVE WITH DIVERGING-CONVERGING FLOW PASSAGE AND METHOD TO REDUCE TOTAL PRESSURE LOSS

(75) Inventors: Stefano Francini, Florence (IT); Nicola Campo, Florence (IT); Michele Bianchini, Florence (IT)

(73) Assignee: Nuovo Pignones, P.A., Florence (IT)

( * ) Notice: Subject to any disclaimer, the term of this patent is extended or adjusted under 35 U.S.C. 154(b) by 850 days.

(21) Appl. No.: 12/183,193

(22) Filed: Jul. 31, 2008

(65) Prior Publication Data
US 2010/0024891 A1 Feb. 4, 2010

(51) Int. Cl.
F16K 21/10 (2006.01)
(52) U.S. Cl. .......... 137/514.5; 137/514.3; 137/540; 251/120; 251/121
(58) Field of Classification Search .......... 137/535, 137/543.15, 540, 543, 516.25, 516.27, 514.3, 137/514.5; 251/516.25, 516.27, 121, 122, 251/118, 120
See application file for complete search history.

(56) References Cited

U.S. PATENT DOCUMENTS

| | | | | |
|---|---|---|---|---|
| 2,870,779 A * | 1/1959 | Thomiszer | ............ | 137/219 |
| 2,918,083 A | 12/1959 | Clark, Jr. et al. | | |
| 3,134,394 A * | 5/1964 | Ohta | ............ | 137/220 |
| 3,605,788 A | 9/1971 | Brown | | |
| 4,638,832 A * | 1/1987 | Mokveld | ............ | 137/220 |
| 4,747,426 A * | 5/1988 | Weevers | ............ | 137/220 |
| 4,911,196 A * | 3/1990 | Kemp | ............ | 137/220 |
| 5,004,009 A * | 4/1991 | Bunce | ............ | 137/512.3 |
| 5,065,790 A * | 11/1991 | Kornas | ............ | 137/514.5 |
| 5,921,276 A * | 7/1999 | Lam et al. | ............ | 137/514.7 |
| 6,132,191 A * | 10/2000 | Hugenroth et al. | ............ | 418/55.1 |
| 6,427,711 B1 * | 8/2002 | Kemp | ............ | 137/15.18 |
| 7,066,722 B2 * | 6/2006 | Dreiman et al. | ............ | 417/559 |
| 7,726,335 B2 * | 6/2010 | Doble | ............ | 137/542 |
| 2010/0025601 A1 | 2/2010 | Francini | | |

FOREIGN PATENT DOCUMENTS

| | | |
|---|---|---|
| DE | 19716471 A1 | 10/1998 |
| GB | 2021238 A | 11/1979 |
| GB | 2159248 A | 11/1985 |

OTHER PUBLICATIONS

European Search Report for EP 09 17 0612 dated Dec. 15, 2009.

* cited by examiner

Primary Examiner — John Rivell
Assistant Examiner — Minh Le
(74) Attorney, Agent, or Firm — Potomac Patent Group PLLC

(57) ABSTRACT

A poppet valve is disclosed that include a valve body, a poppet guide disposed inside the valve body so as to form a flow passage from a flow inlet to a flow outlet of the valve, a poppet shutter disposed inside the poppet guide, and a converging-diverging flow passage formed by a portion of an outer surface of the poppet shutter and a corresponding portion of an inner surface of valve body. A method for reducing a closing pressure force acting on a poppet shutter of a poppet valve is also disclosed.

20 Claims, 5 Drawing Sheets

POPPET VALVE WITH DIVERGING-CONVERGING FLOW PASSAGE AND METHOD TO REDUCE TOTAL PRESSURE LOSS

BACKGROUND OF THE INVENTION

1. Field of the Invention

The embodiments disclosed relate generally to compressors and more particularly to poppet valves of hyper compressors with a converging-diverging flow passage and methods to reduce total pressure loss in these valves.

2. Description of the Related Art

Hyper compressors, those capable of producing gas pressure levels up to or above 3,000 bars, are widely used in industrial application, including, but not limited to, the production of low density polyethylene, or LDPE. The efficient performance of these compressors is controlled at least in part by suction and discharge automatic poppet valves. FIG. 1 illustrates a conventional poppet valve 10 in an opened position. As shown, the conventional poppet valve 10 includes a valve body 11 that contains therein a poppet, or poppet shutter, 12 configured to open and close the gas flow path in and out of a hyper compressor, a spring 14 configured to keep the poppet 12 in a closed position, and a poppet guide 16 that contains the poppet 12 and the spring 14. As shown, when the poppet shutter 12 is forced opened, flow passages 17 are formed from an inlet 18 to an outlet 20, the flow passage 17 being defined by the space formed between the poppet shutter 12 and the valve body 11 as well as by the space between the poppet guide 16 and the valve body 11. The poppet guide 16 of the conventional poppet valve 10 further includes a discharge opening 22 along an axis 24 of the poppet guide 16 connecting an inside chamber 26 of the poppet guide 16 to the flow passages 17 in a region of flow stagnation, the back pressure in the inside chamber 26 of the poppet guide 16 being defined at least in part by the static pressure around the axis 24 of the conventional poppet valve 10.

These poppet valves play an important role in the reliability of hyper compressors used in plants for the production of LDPE. The performance of such valves depends not only on selected material properties and a suitable design to withstand high operating gas pressures, but also on a proper dynamic behavior of the poppet shutter 12. The proper opening and closing of the valve are influenced by various design constraints related to several dynamic forces acting on the valve, including a drag force acting on the poppet shutter 12 and poppet guide 16 to open the valve, this drag force being generated by the interaction of the gas flow with the noted valve parts; a gas pressure force acting on the poppet guide 16 to close the conventional valve 10, this gas pressure force being generated by the flow back pressure acting on a back surface of the poppet guide 16; an inertia force associated with the mass of the poppet shutter 12; and a spring force generated by the spring 14 to close the valve, among others.

One example of the above-noted design constraints includes the requirement of a complete and steady opening of the shutter during the suction stroke of a piston of the hyper compressor. In this case, a reduced flow area may cause increased pressure losses and higher gas temperatures, leading to losses in compressor efficiency. Furthermore, an unstable motion of the shutter may also lead to a reduction in maintenance time between failures due mainly to the increase in the number of impacts between mobile and stationary parts. Another example of a design constraint relates to the requirement of shutter closure by the return spring before the piston motion reverses in order to avoid backflow. In addition, the motion of the poppet during a premature closure may be further accelerated by the gas drag force acting in the same direction as that of the spring force. Yet another example relates to the requirement to maintain impact velocities between mobile and stationary parts within allowable limits in order to prevent or minimize impact surface wear and the need to unnecessarily increasing the impact strength of valve components, thus increasing valve weight and cost. Finally, another example of a design constraint is the requirement for low sensitivity to a sticking phenomenon caused by, among other factors, the presence of lubricating oil and other contaminants in the gas causing sticking in various surfaces in contact with one another, resulting in impact velocity increases and valve closure delays.

Different factors, such as high gas temperatures, early wear, the presence of polymers, or loud noise, may be an indication of poor valve performance that may result in a reduction in the lifetime of the valve. Three-dimensional computational fluid dynamics (or CFD) has been extensively used to accurately simulate pressure losses, drag forces, pressure distributions, and flow coefficient at various valve-operating conditions. Based on these simulation studies and experimental results it is known that poppet motion can be correlated to critical performance factors and can be used to estimate valve life and that, in conventional valve configurations, the above-noted drag and pressure forces are not sufficient to either stably or fully opening the valve. Furthermore, in the flow passage of the conventional valve 10, while the valve is opening, an abrupt flow expansion is formed between the poppet shutter 12 and the inside surface of the valve body 11 at the region identified as element 28 in FIG. 1, thus causing a pressure loss in the flow that initially assists the valve to open, but that later, as opening proceeds, is detrimental to the dynamic performance of the valve because of the large pressure loss in that region and the associated generation of flow instabilities. This locally sustained pressure loss during the valve opening process together with simultaneous pressure increase generated by the back pressure in the inside chamber 26 of the poppet guide 16, as previously noted, therefore, lead to poor dynamic performance of the conventional poppet valve 10.

It would thus be desirable to develop a poppet valve for a hyper compressor with improved performance during the opening thereof while, at the same time, reducing the total pressure losses when the valve is fully opened, thus increasing compressor performance and reducing maintenance and downtime.

BRIEF SUMMARY OF THE INVENTION

One of the controlling variables during the opening process of a poppet valve is the total pressure loss along the flow path. By forming a converging-diverging flow passage between the poppet shutter and an internal surface of the valve body against which the poppet shutter seats, the localized pressure loss in the region of the converging-diverging flow passage is controlled so as to reduce as the valve opens, thereby improving performance during the entire valve-opening process. Both poppet and seat profiles could be differently arranged to set the proper throat section configuration of the converging-diverging flow passage. In addition, in order to reduce the force generated by the backpressure acting on the poppet chamber, a reduced static pressure inside the valve chamber may be generated by the provision of a flow purge passage connecting the throat of the converging-diverging flow passage to the inside chamber of the poppet guide, thereby reducing a gas pressure force acting on the internal poppet chamber to cause the valve to close, reducing the required differential pressure along the valve to open it, and stabilizing the dynamic opening of the valve.

One or more of the above-summarized needs or others known in the art are addressed by poppet valves that include a valve body; a poppet guide disposed inside the valve body so as to form a first portion of a flow passage from a flow inlet to a flow outlet; a poppet shutter disposed inside the poppet guide so as to form a second portion of the flow passage between an outside surface of the poppet shutter and the inside surface of the valve body; and a converging-diverging flow passage formed by a portion of an outer surface of the poppet shutter and a corresponding portion of an inner surface of valve body.

Poppet valves according the subject matter disclose also includes a valve body; a poppet guide disposed inside the valve body so as to form a first portion of a flow passage from a flow inlet to a flow outlet; a poppet shutter disposed inside the poppet guide so as to form a second portion of the flow passage; a biasing member disposed inside an inner chamber of the poppet guide configured to bias the poppet shutter toward an inside surface of the flow inlet so as to block the flow passage; a converging-diverging flow passage formed by a portion of an outer surface of the poppet shutter and a corresponding portion of an inner surface of valve body; and a purge flow passage configured to place an inner chamber of the poppet guide in flow communication with a throat of the converging-diverging flow passage.

Methods for reducing a closing pressure force acting on a poppet shutter of a poppet valve are also with the scope of the subject matter disclosed herein. These methods include steps of, as the valve starts to open and a poppet shutter is located near a seating surface of a valve body, increasing the total pressure loss at the location of a converging-diverging flow passage formed by a portion of an outer surface of a poppet shutter and a corresponding portion of an inner surface of the valve body so as to increase a force acting on the poppet shutter to cause the valve to open; and, as the valve continues to open and the poppet shutter moves further away from the seating surface, decreasing the total pressure loss as a throat area of the converging-diverging flow passage increases.

The above brief description sets forth features of the various embodiments of the present invention in order that the detailed description that follows may be better understood, and in order that the present contributions to the art may be better appreciated. There are, of course, other features of the invention that will be described hereinafter and which will be for the subject matter of the appended claims.

In this respect, before explaining several embodiments of the invention in detail, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

Further, the purpose of the foregoing Abstract is to enable a patent examiner and/or the public generally, and especially scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
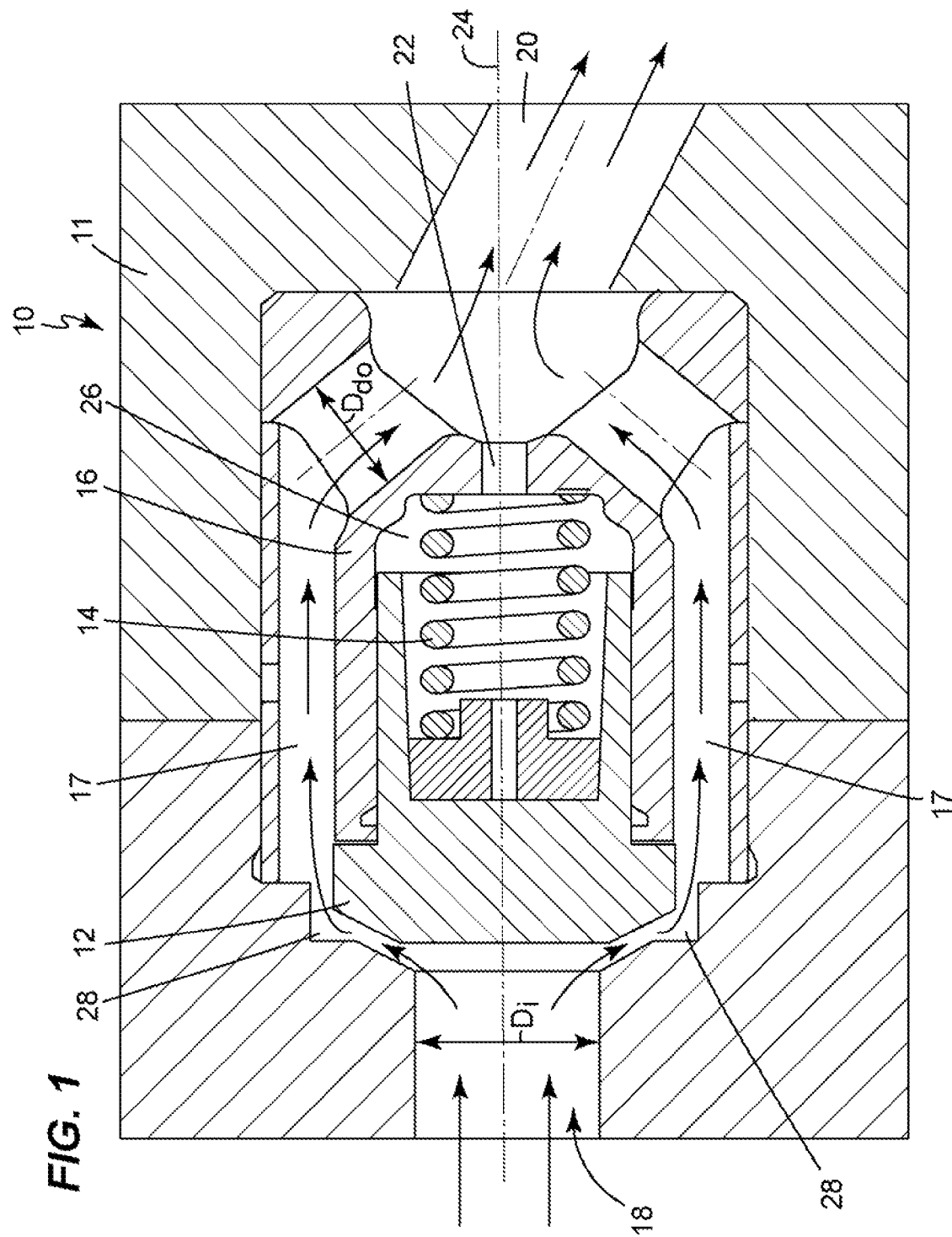
FIG. 1 illustrates a cutaway of a conventional poppet valve in a closed position.

Embodiments of the subject matter disclosed herein relate generally to compressors and more particularly to poppet valves of hyper compressors that include a converging-diverging flow passage to reduce total pressure loss during the opening process. One of the controlling variables during the opening process of a poppet valve is the total pressure loss along the flow path. By forming a converging-diverging flow passage between the poppet shutter and an internal surface of the valve body against which the poppet shutter seats, the localized pressure loss in the region of the converging-diverging flow passage is controlled so as to reduce as the valve opens, thereby improving performance during the entire valve-opening process. In addition, in order to reduce the force generated by the backpressure acting on the poppet chamber, a reduced static pressure inside the valve chamber may be generated by one of two structural features of the subject matter disclosed. The first feature is the provision of a flow purge passage connecting the throat of the converging-diverging flow passage to the inside chamber of the poppet guide; and the other is the provision of a flow purge passage connecting a region of low static pressure in the flow passage of the valve to the inside chamber of the poppet guide, thereby reducing a gas pressure force acting on the internal poppet chamber to cause the valve to close, reducing the required differential pressure along the valve to open it, and stabilizing the dynamic opening of the valve. Referring now to the drawings, wherein like reference numerals designate identical or corresponding parts throughout the several views, several embodiments of poppet valves disclosed herein will be described.

Figure 2:
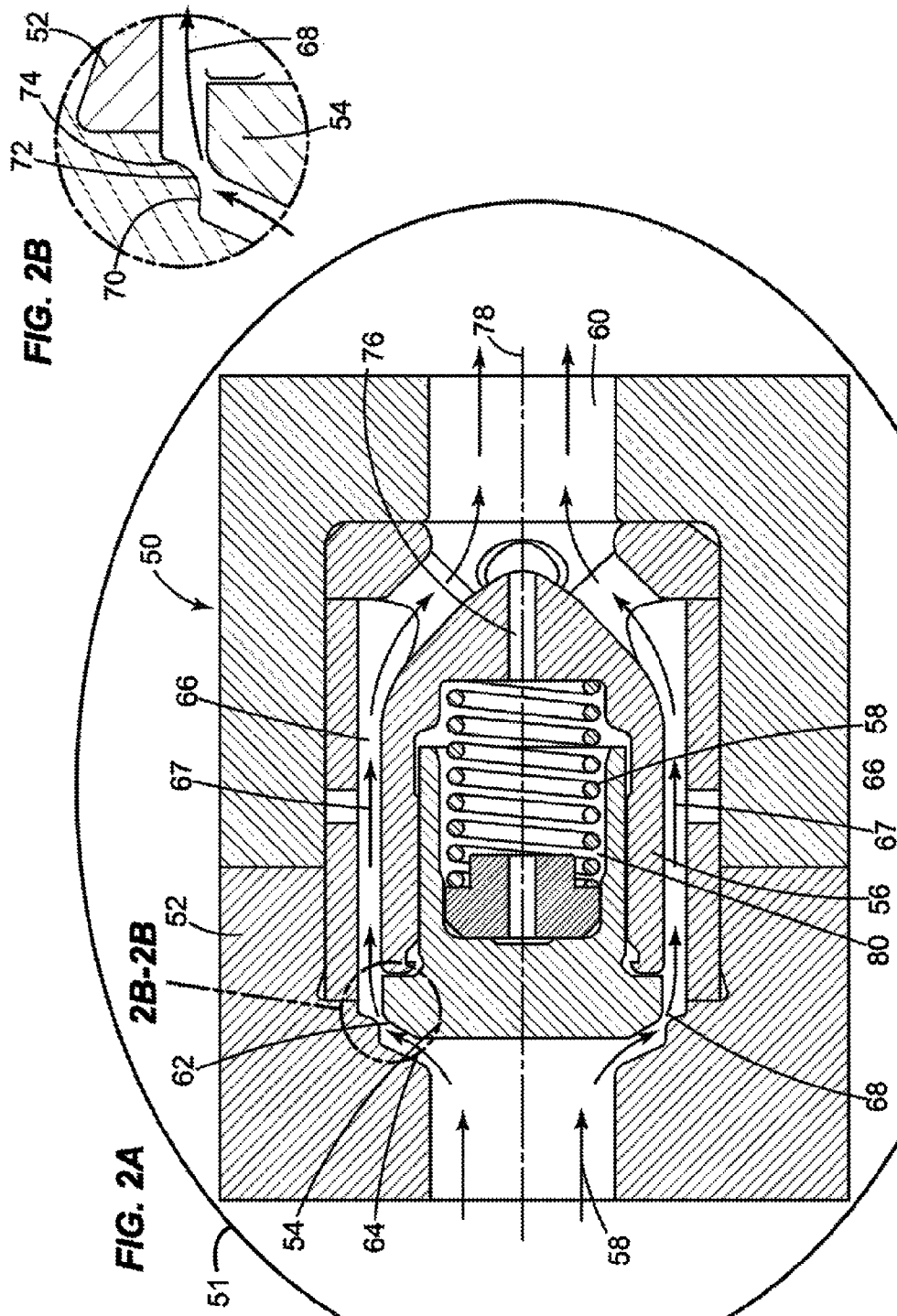
FIG. 2 illustrates a cutaway of a poppet valve in an opened position according to an exemplary embodiment of disclosed subject matter (FIG. 2A) and an enlargement of a converging-diverging passage in the valve (FIG. 2B)

FIG. 2A illustrates a poppet valve 50 which is part of a hyper-compressor 51, in accordance with an exemplary embodiment of the subject matter disclosed and FIG. 2B is an enlarged view of a portion of FIG. 2A. As shown, the poppet valve 50 has been illustrated in an opened position. The poppet valve 50 includes a valve body 52, a shutter 54, a shutter guide 56, and a spring 58 biasing the shutter 54 away from the shutter guide 56. The poppet valve 50 also includes an inlet 58 and an outlet 60. In operation, the spring 58 forces the shutter 54 so that a portion 62 of a surface of the shutter 54 rests against an internal surface 64 of the valve body 52, thereby preventing gas from flowing from the inlet 58 to the outlet 60 or vice versa. When the force exerted on the shutter 54 by the pressure of the gas in the inlet 58 is higher than the biasing force of the spring 58, the shutter 54 is moved to the opened position, thereby allowing gases to flow from the inlet 58 to the outlet 60 through flow passages 66 formed between the shutter 54 and the valve body 52 as well as between the shutter guide 56 and the valve body 52, as illustrated by the arrows 67 in FIG. 2.

Figure 3:
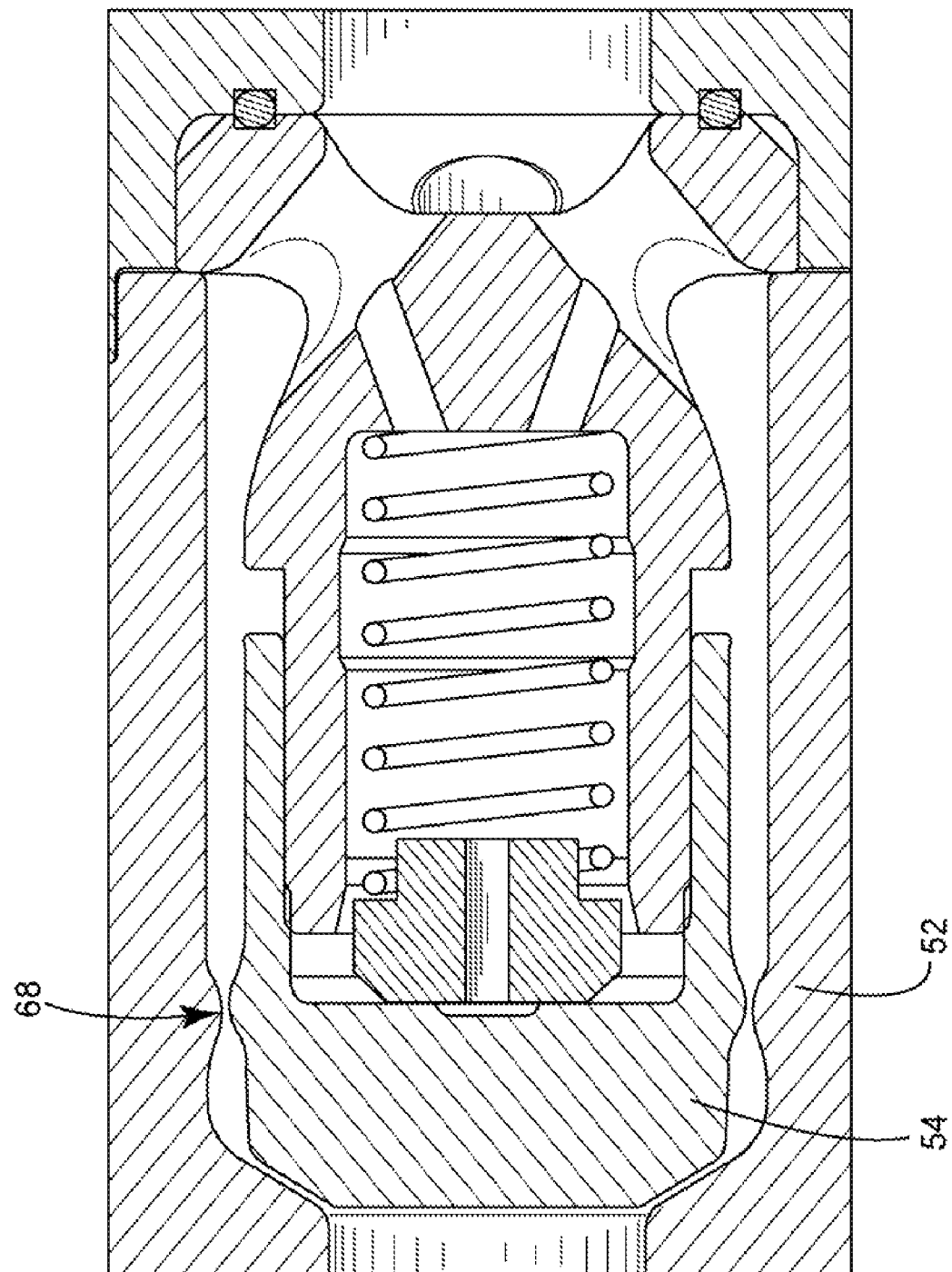
FIG. 3 illustrates a cutaway of a poppet valve in an opened position according to another exemplary embodiment of disclosed subject matter with a converging-diverging passage disposed at a different location in the valve.

As shown in FIG. 2B, the flow passages 66 of the poppet valve 50 further includes converging-diverging passages 68 formed between the poppet shutter 54 and the valve body 52. In operation, when the poppet valve 50 starts to open, a higher total pressure loss in the flow through the converging-diverging passages 66 develops at the location of the converging-diverging passages 68 compared to conventional poppet valves when the poppet shutter 54 is relatively close to the valve body 52. However, as the poppet shutter 54 moves further away from the valve body 52, the pressure loss through the converging-diverging passages 68 is reduced as the valve continues to open. By forming the converging-diverging passages 68 between the poppet shutter 54 and an internal surface of the valve body 54 against which the poppet shutter seats, the localized pressure loss in the region of the converging-diverging passages 68 is controlled so as to reduce as the valve opens, thereby improving performance during the entire valve-opening process. Both poppet and seat profiles could be differently arranged to set the proper throat section configuration of the converging-diverging passages 68. Also, the position of the converging-diverging passages 68 may be moved axially and still maintain the functionality disclosed herein. As shown in FIG. 3, the exemplary embodiment shown in that drawing illustrates the converging-diverging flow passages 68 disposed axially away from the point where the poppet shutter 54 seats against the valve body 52.

As further illustrated in FIG. 2B, each of the converging-diverging flow passages 68 includes a convergent portion 70, a minimum area, or throat 72, and a divergent section 74. As shown in FIG. 2, in one embodiment of the subject matter disclosed herein a discharge opening 76 along an axis 78 of the poppet guide 56 connects an inside chamber 80 of the poppet guide 16 to the flow passage, thereby determining the backpressure acting on poppet shutter 54 forcing it to close. Thus, as explained hereinabove, the axial position of the converging-diverging flow passage 66 along the axis 78 may be changed axially so as to produce the highest shutter force during the valve opening. Also, as already explained, the discharge opening 76 maintains the inside chamber 80 in communication with the exhaust flow at the outlet 60, so that the inner chamber 80 has substantially the same back pressure as outlet 60 along the axis 78 (exhaust flow).

Thus, the proper contouring of the flow passages around the edge of the poppet shutter 54 where the converging-diverging passages 68 are located eliminates, or substantially reduces, boundary layer separation and the generation of recirculation eddies, particularly in the zone of the poppet head, due to the presence of the sudden expansion found in conventional poppet vales, as previously noted. As those of ordinary skill in the applicable arts will understand it, these vortexes are a source of instability for the flow, due to their continuous cyclic formation process. As such, although steady-state CFD simulations cannot give quantitative information on the effects of these eddies on the flow through the valve and on the poppet dynamics, these simulations are a useful tool for the design of different geometries, such as the ones disclosed herein, configured to eliminate, or substantially minimize such sources of losses in the flow through the valve. Thus, the use of the converging-diverging geometry in the head of the poppet shutter 54 eliminates, or substantially avoids boundary layer separation by preventing flow regions with sudden expansions and smoothing flow turns.

Figure 4:
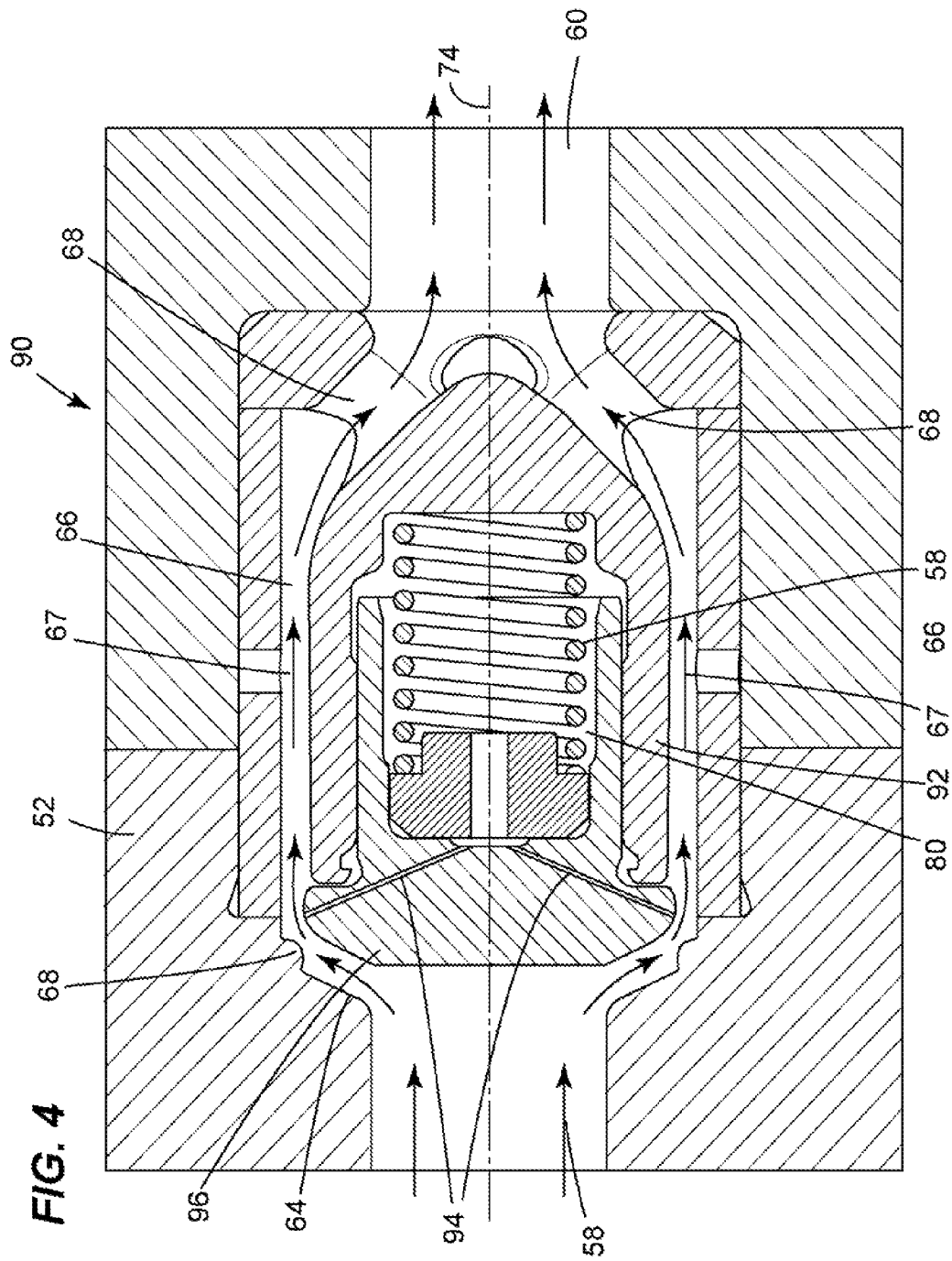
FIG. 4 illustrates a cutaway of a poppet valve in an opened position according to another exemplary embodiment of disclosed subject matter.
Figure 5:
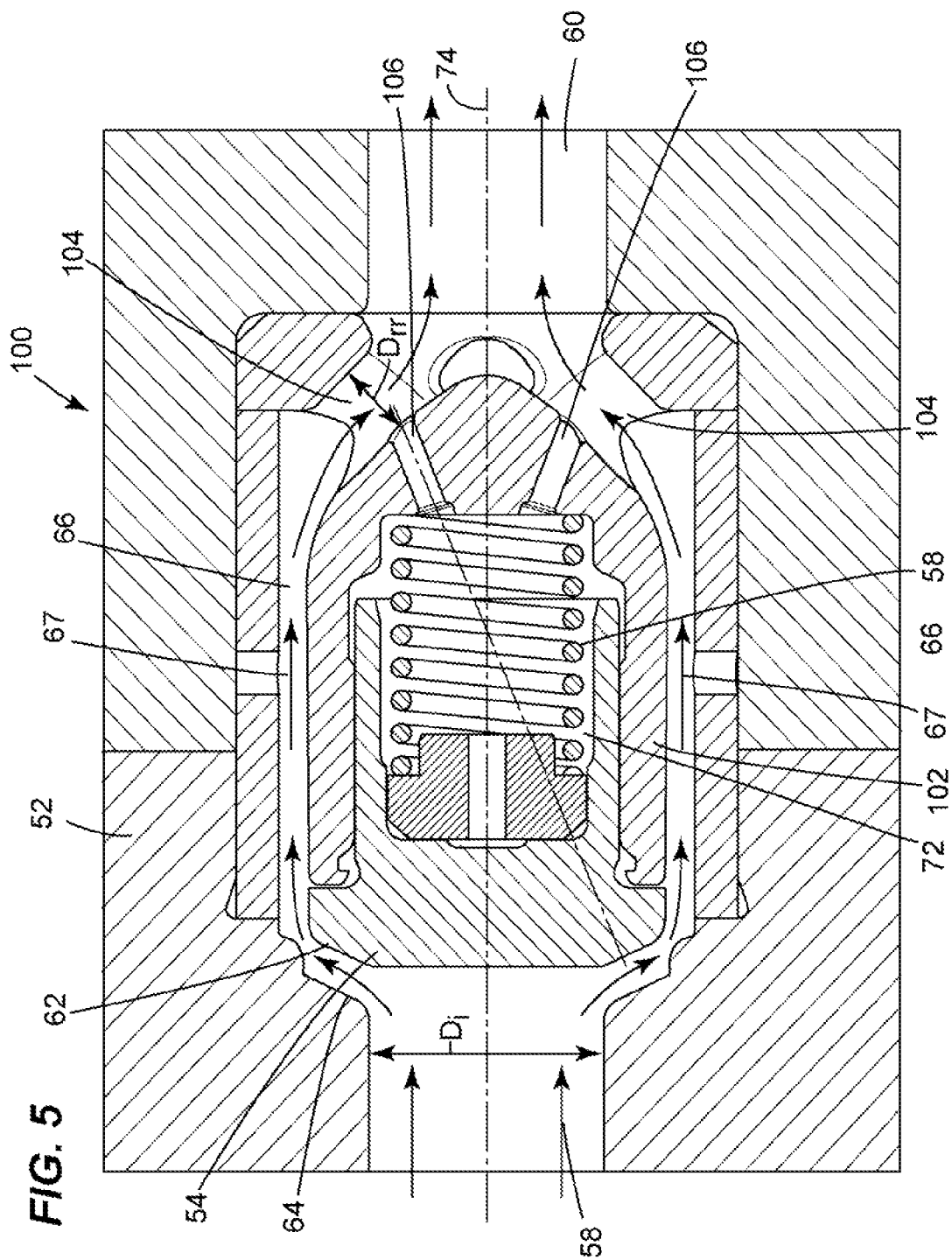
FIG. 5 illustrates a cutaway of a poppet valve in an opened position according to yet another exemplary embodiment of disclosed subject matter.

Since the discharge opening 76 of FIG. 2 is connected to a region of flow stagnation, the backpressure in the inside chamber 80 of the poppet guide 56, being defined at least in part by the static pressure on the axis of poppet valve 50, may be reduced by the different embodiments, as shown by the exemplary illustrations shown in FIGS. 4 and 5. FIG. 4 illustrates an exemplary embodiment of a poppet valve 90 in which a reduced static pressure in the inside chamber 80 of a poppet guide 92 may be generated by the provision of flow passages 94 connecting a region of low static pressure in the converging-diverging passages 68 to the inside chamber 80 of a poppet guide 92, thereby reducing a gas pressure force acting on a back surface of a poppet shutter 96 to cause the poppet valve 90 to close, reducing the required differential pressure along the poppet valve 90 to open it, and stabilizing the dynamic opening of the poppet valve 90. The location of the purge flow passages 94 may be optimized to have a low static pressure in the inside chamber 80 of the poppet valve 90 to facilitate the valve-opening process. In one exemplary embodiment, each of the purge flow passages 94 connects the throat 72 of the converging-diverging passages 68 to the inside chamber 80. In the embodiment of the subject matter illustrated in FIG. 4, the purge flow passages 94 are the only fluidic connection between the flow passages 66 and the inside chamber 80.

Thus, one of the advantageous features of the embodiment illustrated in FIG. 4 that allows an increase of gas forces to open the valve is the shifting of the purge flow passages. Such passages, fundamental for the entrance and exit of gas from the volume included between poppet shutter and the poppet guide (where the spring 58 is disposed) is located in a stagnation zone in FIG. 2, hence pressure applied on the poppet backside is high. Shifting these purge flow passages to the throat of the converging-diverging flow passages 68, where gas velocity reaches higher values, it is possible to lower the pressure causing the gas force acting to close the poppet valve, thus resulting on a drag force higher than the spring force reaction.

In the poppet valve 100 of the exemplary embodiment of FIG. 5, as shown, a shutter guide 102 includes two rear holes 104 that form a portion of the flow passages 66 as well as one or more discharge holes 106 placing the internal chamber 72 of the shutter guide 102 in flow communication with the flow passages 66. As further shown in FIG. 5, the discharge holes 106 are sloped with respect to the central line 74 of the poppet valve 100 such that a region of the flow passages 66 where the gas flow through the poppet valve 100 is accelerating is connected to the internal chamber 72 of the shutter guide 102. Since the flow accelerates through the accelerating-flow region, the static pressure inside the internal chamber 72 is reduced, thereby reducing the gas pressure force acting on the shutter 54 so as to bias it against the internal surface 64 of the valve body 52. In addition, as understood by those of ordinary skill in the art, the diameter of the rear holes 104, $D_{rr}$, may be selected so as to control the amount of flow acceleration in the flow-accelerating region. In particular, the diameter of the rear holes 104 of the poppet valve 100 is smaller than the corresponding holes in the conventional valve 10 shown in FIG. 1. For example, but not to be considered as a limitation, in one particular embodiment, $D_{rr}$ of the poppet valve 100 is 66% of the diameter of the discharge opening 22, $D_{do}$, of the conventional valve 10. Thus, assuming that the poppet valve 100 and the conventional valve 10 have similar inlet diameters, $D_i$, of 25 mm, $D_{do}/D_i$ for the conventional valve 10 is about 0.6 while $D_{rr}/D_i$ for the poppet valve 100 may vary from 0.36 to 0.44, preferably being 0.4. In addition, the inclination angle for the sloped discharge holes 106 are determined so as to assure that the internal chamber 72 is connected to the rear holes 104, taking into consideration the disposition of the spring 58 in the internal chamber 72. Therefore, for the exemplary embodiment just described, the range of values for the inclination angle should be between 10 and 25 degrees, preferably 19 degrees.

Thus some of the advantageous features of the poppet valves 50, 90, and 100 of FIGS. 2-5 include: (1) converging-diverging passages formed between the valve body and poppet shutter 54 such that, when the poppet valve starts to open, a higher total pressure loss in the flow through the flow passages in the valve develops at the location of the converging-diverging passages compared to conventional poppet valves when the poppet shutter is relatively close to the valve body. However, as the poppet shutter moves further away from the valve body, the pressure loss through the converging-diverging passages is reduced as the valve continues to open, thereby improving performance during the entire valve-opening process; (2) the provision of flow passages connecting a region of low static pressure in the converging-diverging passages to the inside chamber of the poppet guide, thereby reducing a gas pressure force acting on a back surface of a poppet shutter to cause the poppet valve to close, reducing the required differential pressure along the poppet valve to open it, and stabilizing the dynamic opening of the poppet valve; and (3) one or more sloped discharge holes connecting the rear holes of the flow passages to the inside chamber of the shutter guide, thereby transmitting the static pressure from a location of low pressure (i.e., a location of flow acceleration) to the inside chamber of the shutter guide. As a consequence the backpressure is reduced and the valve opening becomes more stable during opening/closing transient events. This reduces the pressure losses through the valve, decreases gas temperature at discharge, and reduces impact velocity, thus reducing valve wear and improves valve life. As those of ordinary skill in the applicable arts will appreciate it, the various features disclosed herein to improve the dynamic performance of a poppet valve might be used individually or in any combination described.

CFD simulation results considering fluid motion and valve dynamics have confirmed the operation of the poppet valves 50, 90, and 100 as described above. The mathematical model for the valve dynamic is based on two differential equations, one related to the gas flow passing through the open valve for a certain pressure drop and the other related to the laws of motion of the shutter under the influence of an inertia force due to shutter mass, a damping force, an elastic force from the return spring, a drag force of the gas passing through the valve, and impact forces of the shutter against stationary parts at the end of shutter travel. Fluid flow has been predicted by solving the Reynolds-averaged, Navier-Stokes equations for steady flow using a two-equation eddy-viscosity turbulence model (K-ω) with wall integration boundary treatment.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

What is claimed is:

1. A poppet valve, comprising:
   a valve body, said valve body having a central axis, a flow inlet, and a flow outlet;
   a poppet guide disposed inside the valve body so as to form a first portion of a flow passage from the flow inlet to the flow outlet, said flow passage being formed between an inside surface of the valve body and an outside surface of the poppet guide and passing through at least one hole in the poppet guide;
   a poppet shutter disposed inside the poppet guide so as to form a second portion of the flow passage between an outside surface of the poppet shutter and the inside surface of the valve body; and
   a converging-diverging flow passage formed by a portion of an outer surface of the poppet shutter and a corresponding portion of an inner surface of valve body, wherein the converging-diverging flow passage includes (i) a convergent portion, (ii) a minimum area portion, and (iii) a divergent portion.

2. The poppet valve according to claim 1, wherein, when the poppet valve opens, a total pressure loss in the flow through the converging-diverging passage initially increases when the poppet shutter is close to the valve body and reduces as the poppet shutter moves further away from the valve body as the valve continues to open.

3. The poppet valve according to claim 2, further comprising:
   a biasing member disposed inside an inner chamber of the poppet guide, said biasing member being configured to bias the poppet shutter toward an inside surface of the flow inlet so as to block the flow passage.

4. The poppet valve according to claim 3, wherein the converging-diverging flow passage is located at an edge of the poppet shutter adjacent to a location where the poppet shutter seats against the valve body when the poppet valve is closed.

5. The poppet valve according to claim 3, wherein the converging-diverging flow passage is located axially downstream from an edge of the poppet shutter adjacent to a location where the poppet shutter seats against the valve body when the poppet valve is closed.

6. The poppet valve according to claim 2, further comprising:

a purge flow passage configured to place an inner chamber of the poppet guide in flow communication with a region of low static pressure of the flow passage.

7. The poppet valve according to claim 6, wherein the region of low static pressure is the minimum area portion of the converging-diverging flow passage.

8. The poppet valve according to claim 6, wherein the region of low static pressure is the at least one hole in the poppet guide.

9. The poppet valve according to claim 8, wherein the purge flow passage is inclined with respect to the central axis of the valve body.

10. The poppet valve according to claim 9, wherein an inclination angle of the purge flow passage varies between 10 and 25 degrees.

11. The poppet valve according to claim 10, wherein the inclination angle is approximately 19 degrees.

12. The poppet valve according to claim 9, wherein a ratio of a diameter of the at least one hole to a diameter of the flow inlet ranges from about 0.36 to about 0.44.

13. A hyper compressor comprising a poppet valve that includes:
a valve body, said valve body having a central axis, a flow inlet, and a flow outlet;
a poppet guide disposed inside the valve body so as to form a first portion of a flow passage from the flow inlet to the flow outlet, said flow passage being formed between an inside surface of the valve body and an outside surface of the poppet guide and passing through at least one hole in the poppet guide;
a poppet shutter disposed inside the poppet guide so as to form a second portion of the flow passage between an outside surface of the poppet shutter and the inside surface of the valve body; and
a converging-diverging flow passage formed by a portion of an outer surface of the poppet shutter and a corresponding portion of an inner surface of valve body,
wherein the converging-diverging flow passage includes (i) a convergent portion, (ii) a minimum area portion, and (iii) a divergent portion.

14. A poppet valve, comprising:
a valve body, said valve body having a central axis, a flow inlet, and a flow outlet;
a poppet guide disposed inside the valve body so as to form a first portion of a flow passage from the flow inlet to the flow outlet, said flow passage being formed between an inside surface of the valve body and an outside surface of the poppet guide and passing through at least one hole in the poppet guide;
a poppet shutter disposed inside the poppet guide so as to form a second portion of the flow passage between an outside surface of the poppet shutter and the inside surface of the valve body;
a biasing member disposed inside an inner chamber of the poppet guide, said biasing member being configured to bias the poppet shutter toward an inside surface of the flow inlet so as to block the flow passage;
a converging-diverging flow passage formed by a portion of an outer surface of the poppet shutter and a corresponding portion of an inner surface of the valve body; and
a purge flow passage configured to place an inner chamber of the poppet guide in flow communication with a minimum area portion of the converging-diverging flow passage,
wherein the converging-diverging flow passage includes (i) a convergent portion, (ii) the minimum area portion, and (iii) a divergent portion.

15. The poppet valve according to claim 14, wherein, when the poppet valve opens, a total pressure loss in the flow through the converging-diverging passage initially increases when the poppet shutter is close to the valve body and reduces as the poppet shutter moves further away from the valve body as the valve continues to open.

16. The poppet valve according to claim 15, wherein the converging-diverging flow passage is located at an edge of the poppet shutter adjacent to a location where the poppet shutter seats against the valve body when the poppet valve is closed.

17. A hyper compressor comprising a poppet valve that includes:
a valve body, said valve body having a central axis, a flow inlet, and a flow outlet;
a poppet guide disposed inside the valve body so as to form a first portion of a flow passage from the flow inlet to the flow outlet, said flow passage being formed between an inside surface of the valve body and an outside surface of the poppet guide and passing through at least one hole in the poppet guide;
a poppet shutter disposed inside the poppet guide so as to form a second portion of the flow passage between an outside surface of the poppet shutter and the inside surface of the valve body;
a biasing member disposed inside an inner chamber of the poppet guide, said biasing member being configured to bias the poppet shutter toward an inside surface of the flow inlet so as to block the flow passage;
a converging-diverging flow passage formed by a portion of an outer surface of the poppet shutter and a corresponding portion of an inner surface of the valve body; and
a purge flow passage configured to place an inner chamber of the poppet guide in flow communication with a minimum area portion of the converging-diverging flow passage,
wherein the converging-diverging flow passage includes (i) a convergent portion, (ii) the minimum area portion, and (iii) a divergent portion.

18. A method for reducing a closing pressure force acting on a poppet shutter of a poppet valve, said poppet valve having a valve body with a central axis, a flow inlet, and a flow outlet, said poppet valve including further a poppet guide and a biasing member configured to bias the poppet shutter disposed inside the poppet guide against the valve body so as to close the poppet valve, the method comprising:
as the valve starts to open and the poppet shutter is located near a seating surface of the valve body, increasing the total pressure loss at the location of a converging-diverging flow passage formed by a portion of an outer surface of the poppet shutter and a corresponding portion of an inner surface of the valve body so as to increase a force acting on the poppet shutter to cause the valve to open; and
as the valve continues to open and the poppet shutter moves further away from the seating surface, decreasing the total pressure loss as a throat area of the converging-diverging flow passage increases,
wherein the converging-diverging flow passage includes (i) a convergent portion, (ii) a minimum area portion, and (iii) a divergent portion.

19. The method according to claim 18, further comprising:
placing an inner chamber of the poppet guide in flow communication with a region of reduced static pressure of the converging-diverging flow passage so as to reduce a fluid pressure force acting on an inner surface of the poppet shutter toward an inner surface of the valve body to cause the poppet valve to close.

20. The method according to claim 18, further comprising: placing an inner chamber of the poppet guide in flow communication with a region of reduced static pressure in a flow from the inlet to the outlet of the valve so as to reduce a fluid pressure force acting on an inner surface of the poppet shutter toward an inner surface of the valve body to cause the poppet valve to close, said region of reduced static pressure being located at a region of acceleration in the flow from the inlet to the outlet as the same passes through a hole in the poppet guide.

* * * * *